United States Patent

[11] 3,557,376

| [72] | Inventor | Orest J. Senyk<br>Trenton, N.J. |
| --- | --- | --- |
| [21] | Appl. No. | 799,235 |
| [22] | Filed | Feb. 14, 1969 |
| [45] | Patented | Jan. 19, 1971 |
| [73] | Assignee | Honeywell Inc.<br>Minneapolis, Minn.<br>a corporation of Delaware |

[54] RADIATION SENSITIVE DEVICE FOR FLOW TUBE USING MOVING FLUID TIGHT SEAL
10 Claims, 6 Drawing Figs.

[52] U.S. Cl. .................................................. 250/218,
250/239, 356/208
[51] Int. Cl. ...................................................... G01n 21/26
[50] Field of Search .......................................... 250/218,
219F, 239; 356/207, 208, 180—186

[56]  References Cited
UNITED STATES PATENTS

| 2,578,037 | 12/1951 | Berlant | 250/219X |
| --- | --- | --- | --- |
| 2,791,932 | 5/1957 | Hall | 356/207X |
| 3,099,750 | 7/1963 | Swarthout et al. | 250/219X |
| 3,109,604 | 11/1963 | Brenner | 250/219X |
| 3,240,109 | 5/1966 | Grant, Jr. | 250/218X |

Primary Examiner—Walter Stolwein
Attorneys—Arthur H. Swanson, Lockwood D. Burton and J. Shaw Stevenson ABSTRACT: A transparent film under tension is employed to provide a moving fluidtight seal over and about two opposite but longitudinal openings formed in the displaced wall of a flow tube containing moving matter that is to be continuously analyzed. This seal allows a different clean portion of the transparent film to be continuously brought over each of the aforementioned openings and thereby clean windows through which a source of radiant energy can be directed as this radiant energy is passed into and out of the moving matter in the flow tube and thence to an optical radiant energy detecting and analyzing utilitarian means, such as a turbidimeter.

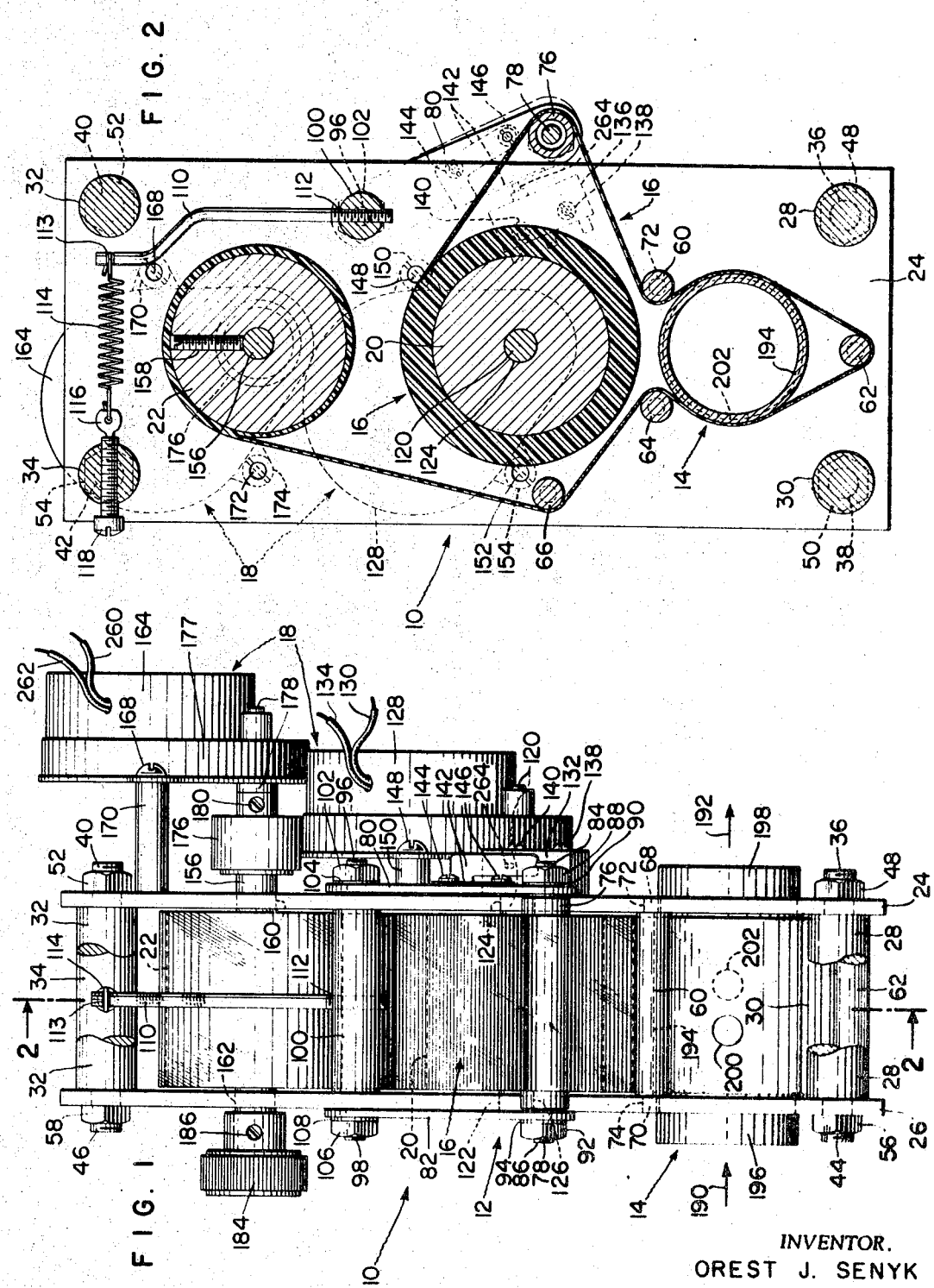

INVENTOR.
OREST J. SENYK

BY
John Shaw Stevenson
AGENT.

3,557,376

RADIATION SENSITIVE DEVICE FOR FLOW TUBE USING MOVING FLUID TIGHT SEAL

Heretofore it has been the practice to employ a stationary glass window as a transparent wall portion of a chamber through which light from a light source is directed into and from the matter within the chamber so that certain optical properties of this matter such as turbidity can be detected by a light detector and a measuring circuit associated therewith that is located outside one of these transparent windows.

Accurate optical characteristics of matter that is measured in this matter cannot be obtained because light absorbing particles in the matter and atmosphere which are deposited on the respective inside and outside portions of these windows destroy the initial optically clean light transmitting characteristics of these windows.

It is therefore one of the objects of the invention to eliminate the aforementioned problem by providing a different portion of a continuously moving transparent film in lieu of the aforementioned windows through which different types of radiant energy, such as collimated light, can be directed into and out of matter in a chamber which may preferably be in the form of a flow tube.

It is one of the salient objects of the present invention to provide a transparent radiant energy transmitting film tape seal for a flow tube in which two openings are formed therein on opposite sides of the tube and which are purposely displaced longitudinally from one another along the tube so that a different longitudinal portion of the transparent film can pass over and form a seal for the first opening in the tube than another remaining longitudinal portion of the transparent film which passes over the second opening in the tube.

The present invention provides a clean movable transparent film for passing over an aperture formed in a wall of a passageway through which matter to be analyzed is passing so that a transparent film or tape will provide a continuously optically clean window through which light from an optical analyzing apparatus can be continuously directed into and out of the moving matter in order to more accurately determine the optical characteristics of this matter.

A means is provided for maintaining tension in the aforementioned transparent film so that the film will form a fluid tight seal with the outer wall surface adjacent the passageway through which the light of the optical analyzing apparatus is directed.

A tensioning apparatus is also provided that will keep a clean portion of a silicon coated transparent polytetrafluoroethylene film in a preselected taut continuously moving fluid sealed engagement over two associated apertures so that the same quantity of radiation can be transmitted through one aperture into a stainless steel sampling chamber into matter contained therein and out of the matter through the second aperture in the chamber.

A modified form of the aforementioned apparatus is provided in which an uncoated transparent polytetrafluoroethylene film is employed in lieu of the aforementioned silicone coated film and a polytetrafluoroethylene sampling chamber is employed in lieu of the aforementioned other stainless steel sampling chamber.

Transparent or semitransparent films are employed such as polyethylene terephthalate in lieu of the aforementioned coated and uncoated tapes.

A better understanding of the present invention may be had from the following detailed description when read in conjunction with the accompanying drawings in which:

FIG. 1 is a top view of the analyzer;

FIG. 2 is an elevational view taken along the lines 2–2 of FIG. 1;

Figure 3:
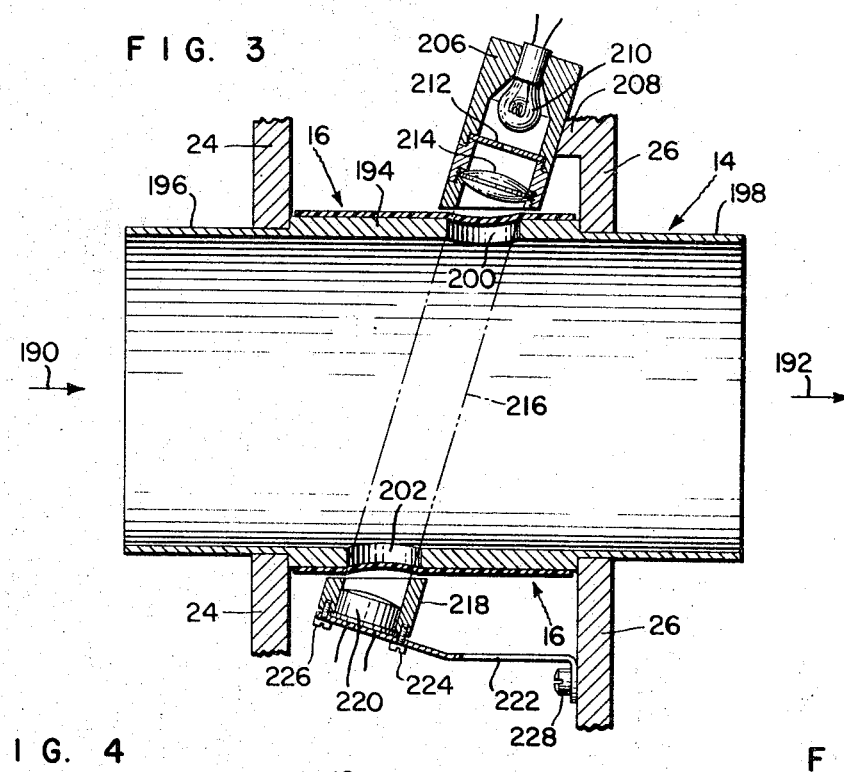
FIG. 3 is a cross-sectional view of the flow tube, film and the apertures associated therewith.

The aforementioned apparatus for maintaining an optically clean window is identifiable in FIGS. 1 and 2 of the drawings as reference numeral 10. This apparatus is comprised of three major parts namely, a frame 12 for maintaining a section of the flow tube 14 in fixed relation therein, a continuously movable transparent film 16, and a film driving means 18 for transporting the film 16 under tension from a supply spool 20 to a takeup spool 22.

The frame 12 is comprised of two rectangular plates 24,26 retained in fixed spaced apart relationship by means of four separating rods 28,30,32,34. Each of the rods 28—34 have opposite sided end portions e.g. 36,38,40,42,44,46 passing through associated apertures in the plates 24,26 and nut members e.g. 48,50,52,54,56,58 threaded thereon to maintain the plates 24,26 in the aforementioned fixed spaced apart relationship.

Four rollers 60,62,64,66 extend between the plates 24,26. By way of illustration FIG. 1 shows that the opposite ends 68,70 of one of these rollers 60 are of a smaller diameter than the portion extending between the plates 24,26 and that these ends are rotatably mounted in walls 72,74 forming apertures in the plates 24,26. The opposite ends of the other rollers 62—66 are constructed in the same manner as that just described for roller 60 so they can be rotatably mounted in the plates 24,26.

A sleeve 76 rotatably mounted on a rod 78 forms a fifth roller. The ends of the rod 78 extend through the right end of a first pair of tension arm plates 80,82 the opposite end portions of the rod 78 contain threaded portions 84,86 to accommodate the mounting of the nut and lock washer members 88,90,92,94 thereon to retain the rod 78 in nonmovable contact with the plates 80,82.

The left end portions of the tension arms 80,82 are fixedly mounted on the reduced diametrical opposite threaded end portions 96,98 of rod 100 by means of the nut and lock washer connections 102,104,106,108.

A second tension arm in the form of a rod 110 is shown threadedly connected at 112 for movement with the rod 100. The other end of the rod 110 has a slotted portion 113 formed therein to retain one end of a tension spring 114 in spring biased engagement thereon. The other end of the spring 114 is attached to a swivel 116 of an adjustable screw member 118 that is shown passing through and threadedly mounted to the rod 34.

The opposite end portions 120,122 of the supply spool 20 are rotatably mounted in wall portions 124,126 that form apertures in the sidewalls 24,26.

Figure 6:
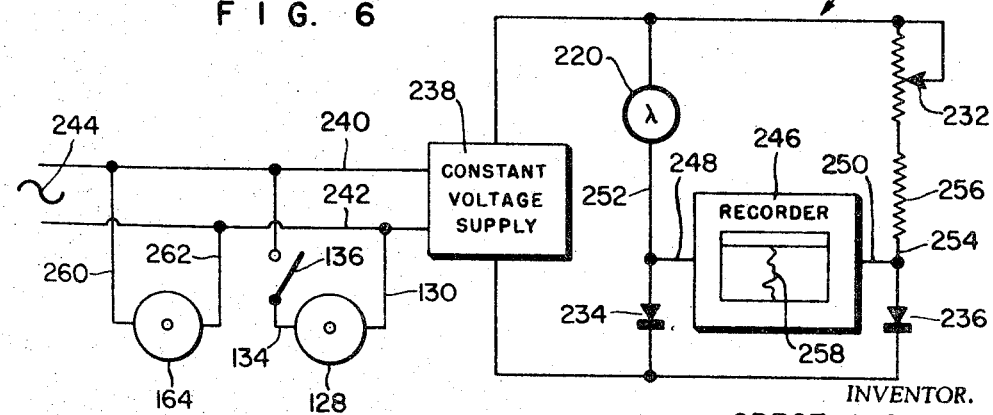
FIG. 6 is a typical radiant energy measuring circuit and tape drive motor switching circuit which can be employed with the apparatus shown in FIGS. 1–5 to measure an optical characteristic of matter, such as turbidity.

A constant speed electric motor 128 is shown having power conductor lead 130 extending therefrom to a power source to be described under the description of FIG. 6.

FIG. 1 shows a speed reduction gear drive member 132 positioned between the motor 128 and the supply spool drive shaft 120 so that the supply spool 20 can be driven at a relatively slow speed. The electric motor 128 is also connected by a suitable conductor connection 134 to button switch 136 shown in FIG. 2 and 6. This switch 136 is supported by means of screw retaining means 138,140 on one of the side plates 24 of the frame 12. A switch actuating bracket 142 is retained by means of the screw retainer means 144,146 in fixed relationship with the tension arm plate 80.

It can be seen in FIGS. 1 and 2 that the motor 128 and the gear reduction unit 132 are fixedly connected to the side plate 24 by means of screw and spacer members 148,150,152,154.

The takeup spool 22 is fixedly connected for rotation with a takeup spool shaft 156 by means of a setscrew 158. The opposite end portions of the takeup spool shaft 156 are rotatably mounted in wall portions 160,162 that form apertures in the side walls 24,26.

A constant speed electric motor 164 that is of a slower speed than the supply spool drive motor 128 is mounted by means of two screw-spacer sleeve connections 168,170,172,174 to side plate 24.

The takeup spool shaft 156 is connected by means of a one way drive clutch 176 to a takeup spool drive motor shaft 178 that extends out of its gear reduction unit 177. This clutch 176 is fixedly connected to the motor shaft 178 by means of a suitable number of spaced apart setscrew connections one of which is identified in the drawing as 180. The clutch 176 will allow the takeup motor 164 to drive the motor drive shaft 178, takeup spool shaft 156 and take up spool 22 in a direction to wrap the transparent film 16 on the takeup spool 22. The other opposite end of the takeup spool shaft 156 is shown having a manually adjustable knob 184 mounted thereon by means of a suitable number of setscrews one of which is identified in the drawing as 186 to provide initial tension in the film 16.

The chamber or passageway 14 through which a matter to be analyzed is allowed to flow in e.g. the direction of the arrows 190,192 is shown as a flow tube that can be inserted in and form part of a process flow conduit, not shown, by merely connecting its ends to separated portions of such a flow conduit.

Alternately a plug can be inserted into each of the ends of the chamber 14 and a fluid inlet tube connection made through one of these plugs and a fluid flow outlet tube connection made through the other remaining plug in order to provide a test cell.

The tube 14 employed in either of the aforementioned arrangements is provided, as is best shown in FIG. 3, with a central portion 194 extending between the sidewalls 24,26 that is of a greater diameter than the remaining end portions 196,198 in order to provide shoulders between each of these tube portions so that the side plates 24,26 can retain the tube in a fixed position therewith.

The tube 14 is also provided with two drilled out displaced cylindrical wall portions 200,202 which provide apertures in the tube 14 over which the transparent film 16 is moved as it is transported from its wrapped position about the supply spool 20 to its wrapped position on the takeup spool 22.

Figures 4, 5:
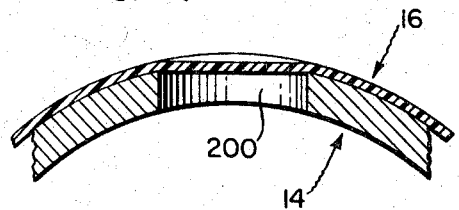
FIG. 4 is an enlarged sectional view of the apertures in the flow tube shown in FIG. 3.
FIG. 5 is a modified form of the flow tube aperture construction shown in FIG. 4.

The construction of each of the cylindrical drilled out wall portions 200,202 are the same as that shown in the enlarged view shown in FIG. 4 for the drilled out wall portion 200.

FIG. 5 shows that a modified form of opening in the wall portion 200a can be employed in lieu of the drilled out wall construction 200,202 shown in FIG. 3. In the FIG. 5 construction, a ridge 204 is formed on the outer surface of the wall 200a of the flow tube 14a that forms the aperture therein by spinning in a tapered mandrel and then buffing lightly to obtain the shape shown in this FIG. 5. This construction will allow the transparent tape 16 to provide a fluid seal over and around the ridge 204 of the tube 14a that forms an opening therein.

Referring now to FIG. 3 it can be seen that a hollow light shield 206 that is of a cup shaped configuration is shown fixedly connected by means of a suitable bracket 208 to the side wall 26.

Within the shield is a radiant energy source e.g. a light source 210, an aperture plate 212 and lens 214 to form collimated light 216 for passing through the portion of a transparent tape 16 that is moving over the apertured wall 200 through the matter, e.g. fluid not shown that is passing through the flow tube 14 in the direction of the arrows 190,192, through the aperture wall 202 through the portion of the tape 16 that is moving over the aperture wall 202 and thence through a sleeve member 218 to a photocell 220. It can be seen that this photocell 220 purposely longitudinally displaced on the opposite side of the flow tube 14 from the location at which the radiant energy source 210 is located. In this manner the tape passing over the apertured wall 200 and the apertured wall 202 will for the first time be exposed to the matter in the chamber. The tape therefore always provides an optically clean window or chamber wall portion through which the radiant energy source 210 can be transmitted into and out of the matter in the chamber 14. The aforementioned photocell 220 is retained at its outer peripheral surface in the lower portion of the sleeve 218 and its base is retained in place and supported by means of a bracket 222. One end of the bracket 222 is fixedly connected to the base of the sleeve by the screw connections 224,226 and the other end is connected by a suitable screw connection 228 to the side plate 26.

The right side of FIG. 6 shows how the photocell tube 220 previously described under the description of FIG. 3 is employed in a bridge circuit 230. This part of the circuit employs well known parts, namely, a zero adjusting pot 232 for making a zero adjustment, two log diodes 234,236 a constant voltage supply 238 connected by the conductors 240,242 to a power supply 244. A recorder 246 is also shown connected by conductors 248,250 to the bridge conductors 252,254 and resistor 256 to record a line 258 showing an optical characteristic e.g. a turbidity measurement of a fluid or other matter passing through the tube 14.

The left side of the circuit in FIG. 6 shows that the motor 164 connected to the takeup drive spool 22 is connected by way of the conductors 260,262,240,242 to the power source 244 so that it will be continuously driven at a constant speed and cause the transparent film 16 to be wound on this takeup spool 22 as shown in FIGS. 2 and 3.

The left side of the circuit shown in FIG. 6 also indicates that the motor 128 driving the supply spool 20 is connected by way of the conductors 130,134,240,242 to the power supply 244 by way of the button actuated switch 136 shown in detail in FIGS. 1 and 2.

OPERATION OF FILM DRIVING MEANS 18

The driving means 18 employed to transport the transparent film 16 under tension from the supply spool 20 to the takeup spool 22 operates as follows:

The electric motor 164 that is employed to drive the takeup spool 22 is driven at a continuous constant speed but at a slower speed than the speed at which the constant speed electric motor 128 that is employed to drive the supply spool 20 is operated.

When the supply and takeup spool drive motors 128,164 are energized the transparent tape 16 will be reeled out at an appreciably faster rate off of the supply spool 20 than the rate at which it is being wound on the takeup spool 22 because of the difference in speed at which these motors 128,164 are being operated.

Despite the aforementioned lengthening and shortening of the tape, the tape is kept at a substantially constant tension by the rocking motion of the arms 80, 82 and 110.

As the length of the transparent tape extending between the supply and takeup spools 20,22 increases in the aforementioned manner the tension spring 114 will be able to apply its spring force by way of tension arm 110 to the tape 16. This action will cause the rod 100 and its associated tension arm plates 80,82 and the rod 78 and its associated roller sleeve 76 that is in contact with the transparent tape 16 to rotate as a unitary member on the bearing end portions 96,98 that are mounted for rotation in the side plates 24,26 to thereby maintain constant tension in the film 16.

As the aforementioned action continues it will cause the switch actuating bracket 142 mounted on the moving tension arm 80 to move from its depressed condition with the button 264 of switch 136 to a nondepressed condition with this button 264. In other words the aforementioned switching action takes place as the moving tension arm 80 is moved from its solid line through its dotted line position as shown in FIG. 2 of the drawing.

The aforementioned switching action will cause the switch 136 shown in FIG. 6 to open and the current to the supply motor to be cutoff. The takeup spool drive motor 164 will then continue to rotate the takeup spool 22 and wrap more of the transparent film 16 that was previously unwound from the supply spool 20 onto the takeup spool 22 while the supply spool 20 remains in the aforementioned nonrotating nonspooling off position.

As the takeup spool continues to pull in the transparent tape 16 under this condition an increasing amount of tension will be applied to the tape 16 and this will cause the tape 16 to apply a downward force on the roller sleeve 76 and its associated rod 78.

The aforementioned action will cause the tension arm plates 80,82 rod 100 and tension rod 110 to be rotated in the opposite direction on the bearing end portions 96,98 to that which occurred during the previous period. Namely, a condition in which the supply motor 128 is energized and the switch bracket 142 is brought into engagement with the button 264 of the switch 136 to close the switch 136 and cut in a power source 244 to the motor 128 as shown in FIG. 6. When this occurs the supply spool 20 will again be driven in a direction to unwind more transparent tape 16 therefrom while the spring bias tension arms 110, 80, 82, roller 100 and spring 114 continue to maintain the film in tension during the aforementioned described time in which the supply motor is energized and during the time the supply motor is cutout and deenergized by the action of switch bracket 142 hitting the switch 136 just described.

By maintaining constant tension in the aforementioned manner on the transparent film 16 it is possible to retain the successive portions of the film that are being passed over the displaced apertures 200,202 of the flow tube 14 in fluid-type sealed contact therewith.

It should be understood that it is the preferred embodiment to provide a flow tube 14 of a polished stainless steel construction and the transparent tape 16 of a silicone coated polytetrafluorethylene material which is preferably of the order of one mil thickness. With film 16 of this thickness and the slow speed of the motor 164 it is possible to operate the aforementioned apparatus for a period of one year without replenishing the film supply 16.

It should further be understood that the aforementioned transparent tape need not be coated with silicone if the flow tube 14 over which the film 16 is brought into contact is made of polytetrafluoroethylene.

Alternatively the transparent tape 16 may be made of polyethylene terephthalate, trade named MYLAR could be used with the stainless steel flow tube 14 where extreme toughness is required and higher pressures of the fluid in other matter in the flow tube are required to be used.

I claim:

1. An analyzer having a chamber adapted to contain matter to be analyzed, comprising an elongated transparent fluidtight seal extending in movable physical contact around an outer peripheral surface of the chamber, one elongated portion of the seal being positioned to pass over a first aperture formed in the chamber wall and to provide a moving fluidtight seal with the outer surface of the chamber wall that surrounds said first aperture, another elongated portion of the seal being positioned to pass over a second aperture formed in another wall portion of the chamber that is diagonally opposite the first mentioned aperture that is formed in the wall of said chamber and to provide a moving fluid seal with the outer surface of the chamber wall that surrounds the wall forming said second aperture a radiant energy source positioned to pass radiant energy through the portions of the movable seal covering said first aperture through said last mentioned aperture into said matter and a responsive means positioned in aligned relationship with the second aperture that is formed in the wall of the chamber and the movable portion of the seal covering said last mentioned aperture to respond to the radiant energy emitted from said matter through the last mentioned aperture and associated moving seal portion as said transparent seal is moved around said outer surface of the chamber.

2. The apparatus as defined in claim 1 wherein the chamber is constructed of a polished steel material, and the seals are constructed of a silicon coated polytetrafluorethylene film.

3. The apparatus as defined in claim 1 wherein the chamber is a cylindrical flow tube and the chamber is constructed of a polytetrafluorethylene material and the seal is a polytetrafluorethylene film.

4. The apparatus as defined in claim 1 wherein the seal is constructed of polyethylene terephthalate and the chamber is a flow tube having walls forming cylindrical apertures therein that are angularly displaced from one another on opposite sides of the tube under each of said transparent seals.

5. The apparatus as defined in claim 1 wherein the seal is a transparent film in the form of an elongated tape having one end attached to a supply spool driven by a first drive means that is operated at one speed, the other end of the tape being attached to a takeup spool that is continuously driven by a second drive means that is operated at a slower speed than the speed at which the supply spool is being operated and a spring biased constant tension retaining means operably connected with the first drive means to energize the first drive means upon the occurrence of a preselected reduction in the length of the unwrapped tape and said spring biased tensioning means being further operably connected with the first drive means to deenergize and stop the first drive means upon the occurrence of a preselected increase in the length of the unwrapped tape, and rollers positioned adjacent said external wall of the chamber to guide said movable fluidtight seal portions of the tape over and surrounding the top of a wall portion of the chamber that forms the two apertures in the wall of the chamber that are angularly and longitudinally displaced from one another.

6. The apparatus as defined in claim 1 wherein the chamber is of a tube shaped configuration to accommodate the passage of said matter therethrough, and wherein the wall of said tube has a pair of cylindrical apertures formed therein diagonally displaced from one another immediately below each of said movable transparent seals, the radiation source is collimated light and the response means is a light detecting cell operably connected to an electrical measuring circuit for measuring the turbidity of the matter in the tube.

7. The apparatus as disclosed in claim 1 wherein a roller is positioned adjacent to the external wall of said chamber for guiding a movable part of the seal between said transparent wall portions of said chamber.

8. The apparatus disclosed in claim 1 wherein a single strip of film is employed as the elongated transparent fluid tight seals and wherein successive parts of one elongated portion of the film are moved over a first opening in the chamber to form said first mentioned moving transparent seal and wherein successive parts of another elongated portion of the film are moved over a second opening in the chamber to form said second mentioned moving transparent seal.

9. The apparatus disclosed in claim 1 wherein the source of radiation is a light source positioned to direct collimated light through the first transparent light seal at an angle into the chamber through the material and the second transparent light seal to the responsive means.

10. The apparatus as disclosed in claim 1 wherein the elongated transparent fluidtight seals are comprised of a single strip of film and a tensioning means is employed to maintain a preselected fixed amount of tension in said movable film.